United States Patent
Novotny

(10) Patent No.: US 6,505,869 B2
(45) Date of Patent: Jan. 14, 2003

(54) COMBINATION WEEDING TOOL

(76) Inventor: Raymond J. Novotny, 2345 Hailey Ct., Fogelsville, PA (US) 18051

( * ) Notice: Subject to any disclaimer, the term of this patent is extended or adjusted under 35 U.S.C. 154(b) by 0 days.

(21) Appl. No.: 09/915,389

(22) Filed: Jul. 26, 2001

(65) Prior Publication Data

US 2002/0030370 A1 Mar. 14, 2002

Related U.S. Application Data

(60) Provisional application No. 60/230,308, filed on Sep. 6, 2000.

(51) Int. Cl.[7] .................................................. A01B 1/16
(52) U.S. Cl. ........................ 294/50.6; 294/51; 172/373; 7/114; 254/132
(58) Field of Search ........................ 294/50.6, 51, 53.5, 294/59; 7/114; 172/372, 373, 374, 375; 254/131.5, 132

(56) References Cited

U.S. PATENT DOCUMENTS

| | | | | |
|---|---|---|---|---|
| 1,325,014 A | * | 12/1919 | Gilson ............................. | 7/114 |
| 1,632,260 A | * | 6/1927 | Woodall ......................... | 7/114 |
| 2,349,621 A | | 5/1944 | Hardman ..................... | 294/55.5 |
| 2,504,746 A | | 4/1950 | Stecker et al. .............. | 254/132 |
| D230,247 S | * | 2/1974 | Parry .............................. | 7/114 |
| 3,865,348 A | | 2/1975 | Close ........................... | 294/49 |
| 3,976,282 A | | 8/1976 | Baker | |
| 4,281,866 A | | 8/1981 | Atcheson ................... | 294/50.5 |
| 4,476,939 A | * | 10/1984 | Wallace ....................... | 172/374 |
| D280,693 S | | 9/1985 | Baker | |
| 4,606,089 A | * | 8/1986 | King ............................ | 172/375 |
| 4,815,778 A | | 3/1989 | Hoch ....................... | 254/131.5 |
| 5,103,520 A | * | 4/1992 | Mazzo .......................... | 294/51 |
| 5,452,769 A | * | 9/1995 | Markert ....................... | 172/372 |

* cited by examiner

*Primary Examiner*—Dean J. Kramer

(57) ABSTRACT

A weeding tool with a combination of attachments integrated with a fulcrum to remove specific types of weeds based on their root structure. The attachments remove weeds whose roots are characterized as lengthy single-type roots, medium-depth bushy-hair type roots and near-surface vine-type roots. A fulcrum slidably attached to the tool handle ergonomically assists the gardener in extracting weeds by limiting angular rotation of the handle. The fulcrum may be used to apply foot pressure in penetrating hard soil. The fulcrum slides on the tool handle with respect to the end of the lifting blade to vary its penetration depth and is used for extracting single-type weed roots at different depths. The multiple-tine rake rotatably attached to the fulcrum is snapped into position and spring-biased to remain in position for extracting weeds having medium-depth bushy roots. The cultivator bar rotatably attached to the fulcrum is snapped into position for near-surface weed removal or general soil tilling. A crevice blade, rotatably attached to the fulcrum removes weeds between the gaps of patio paving blocks and the like, is snapped into position for this task. Most of these attachments can be combined onto one tool or other combinations integrated with the slidably attached fulcrum.

20 Claims, 7 Drawing Sheets

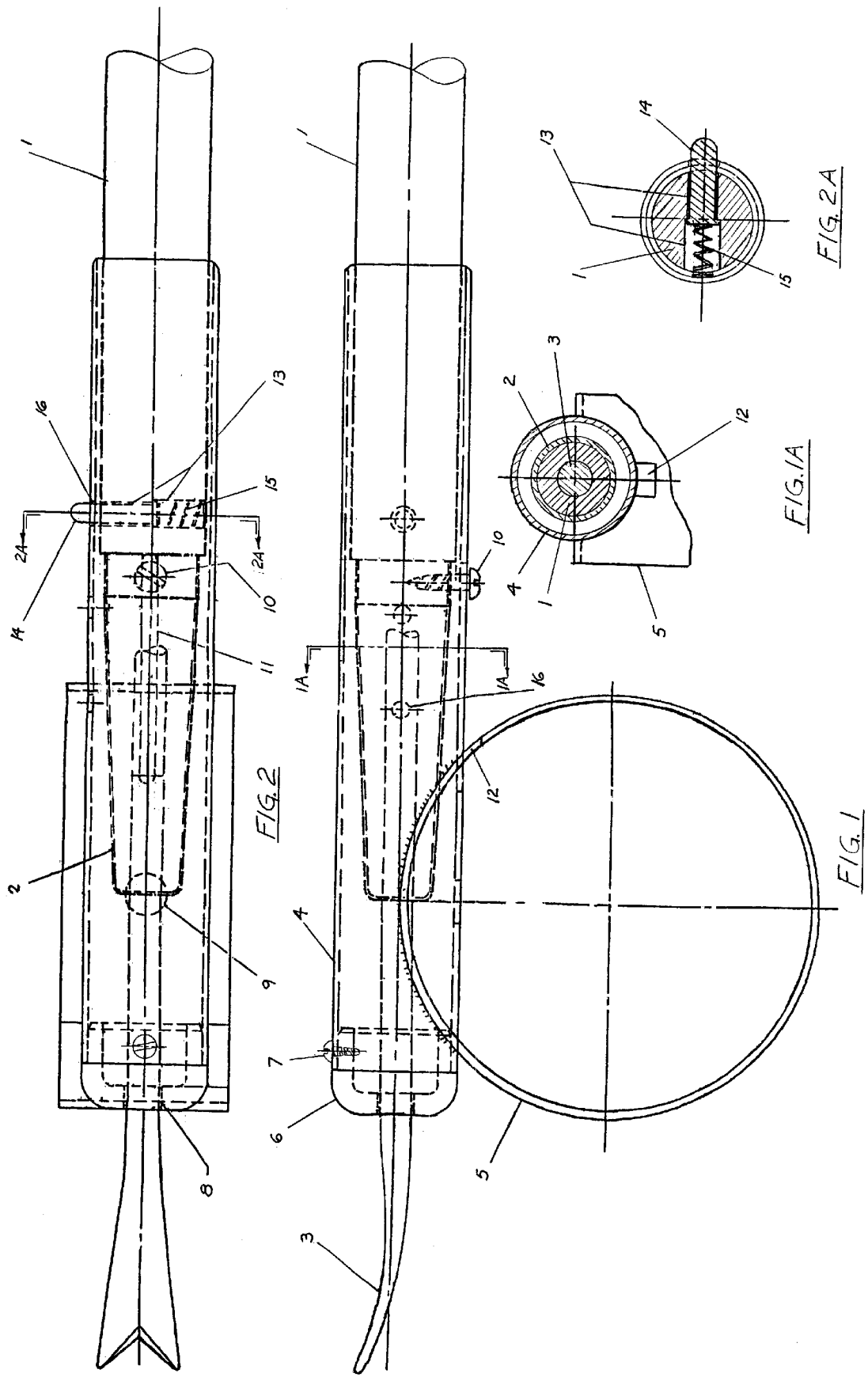

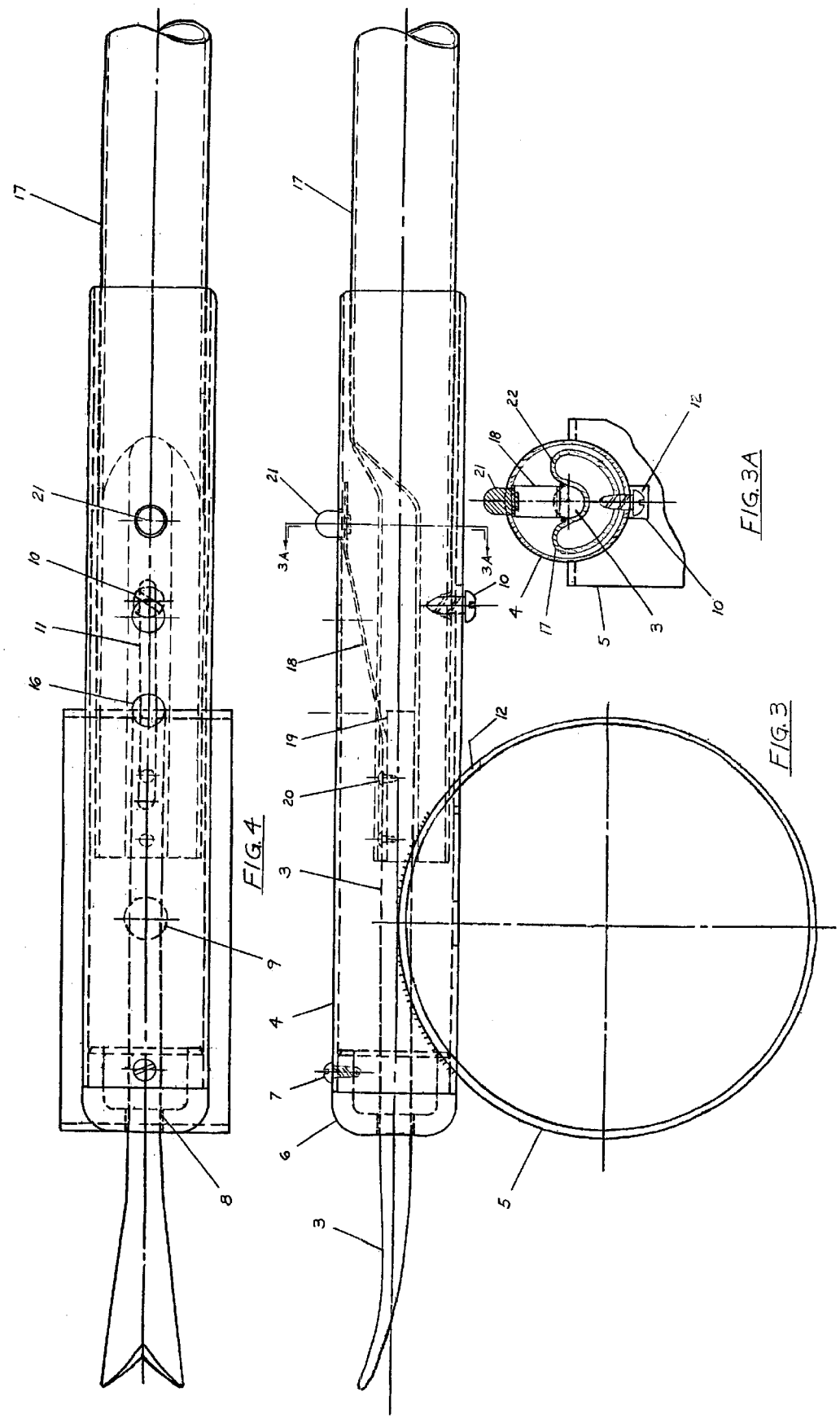

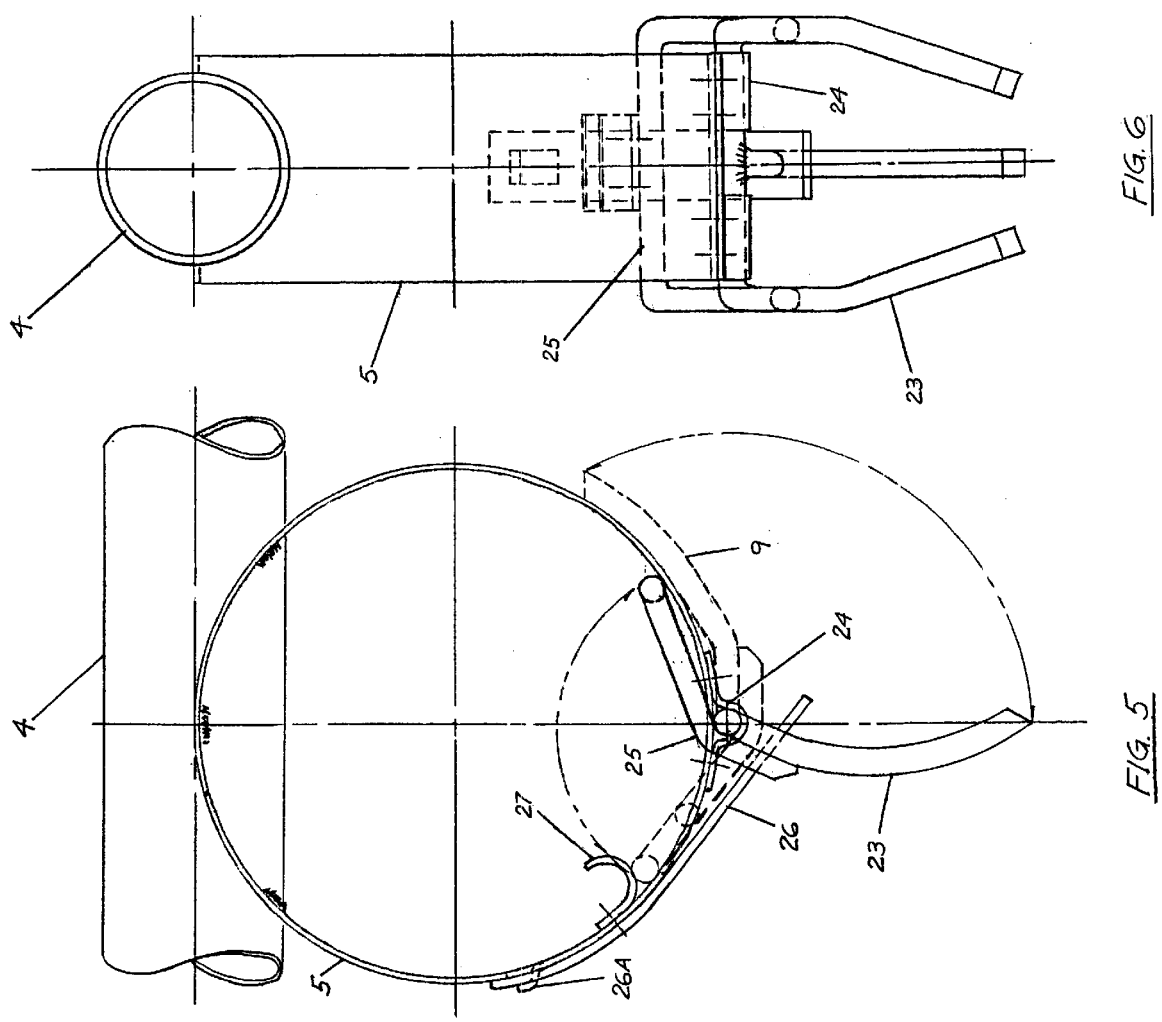

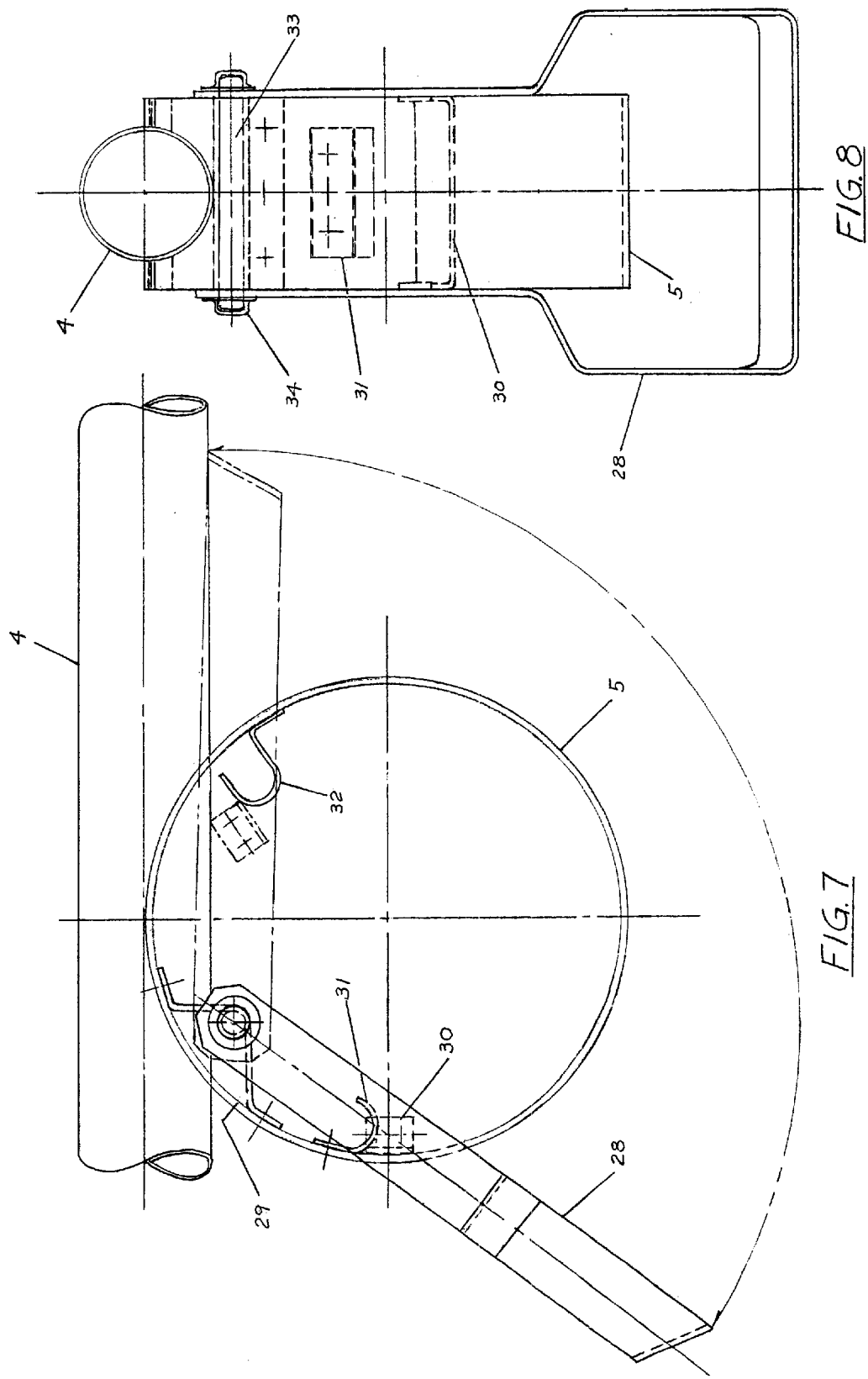

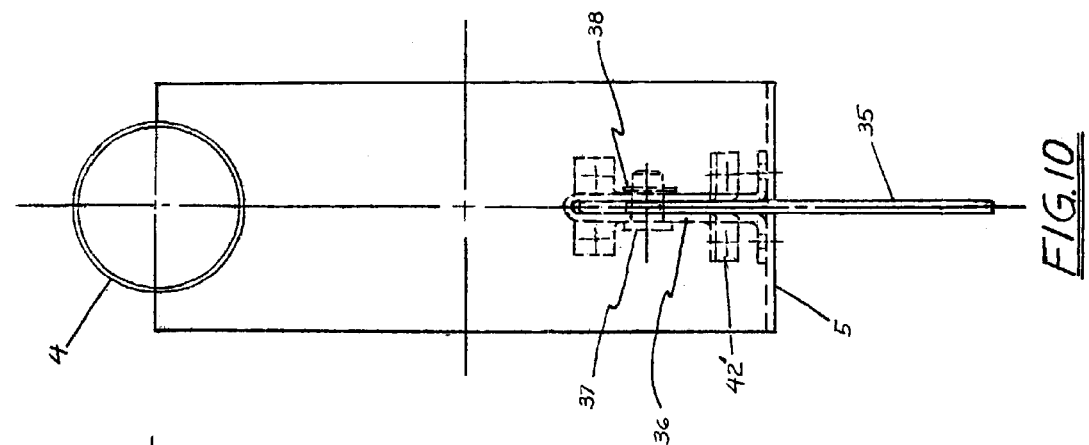
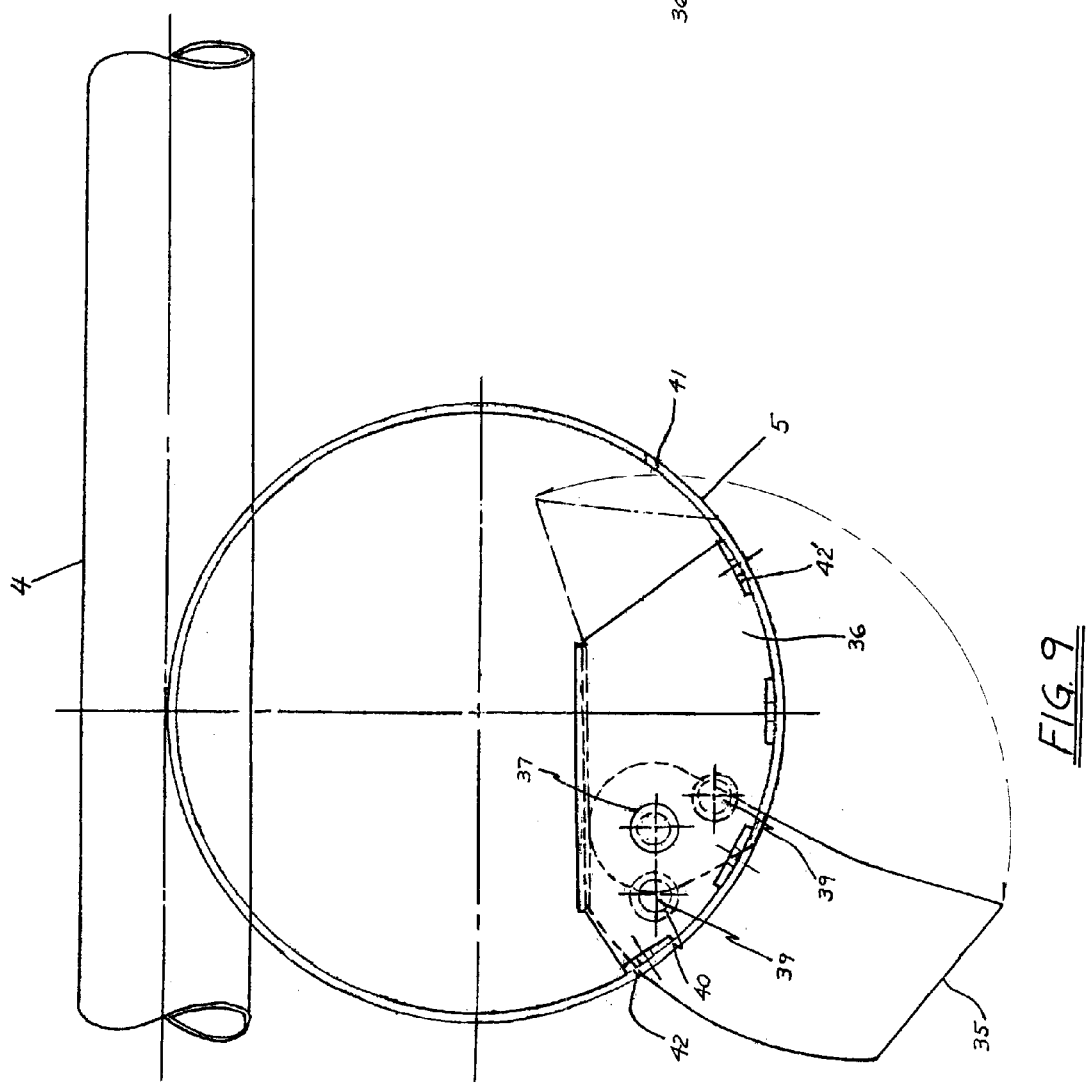

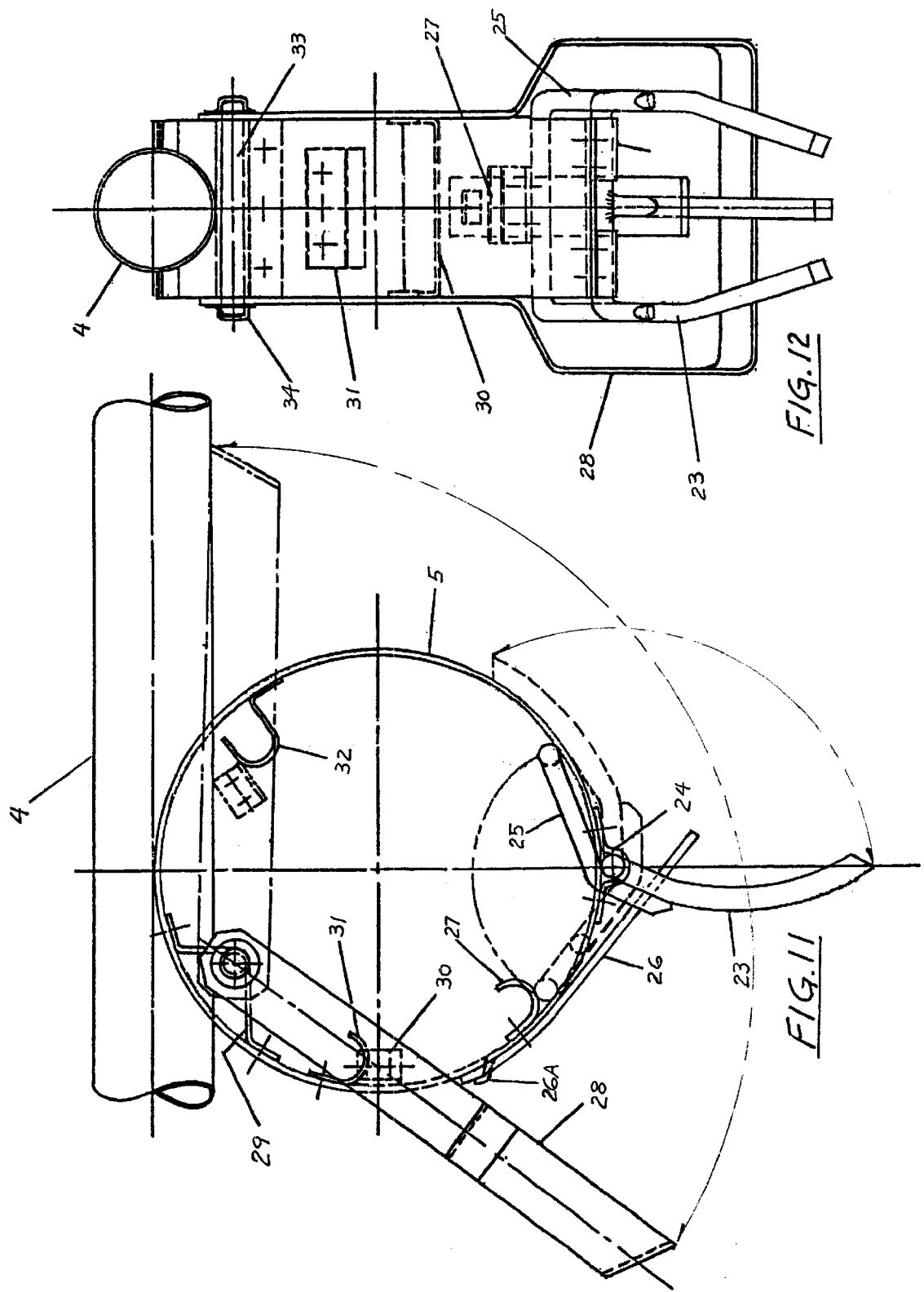

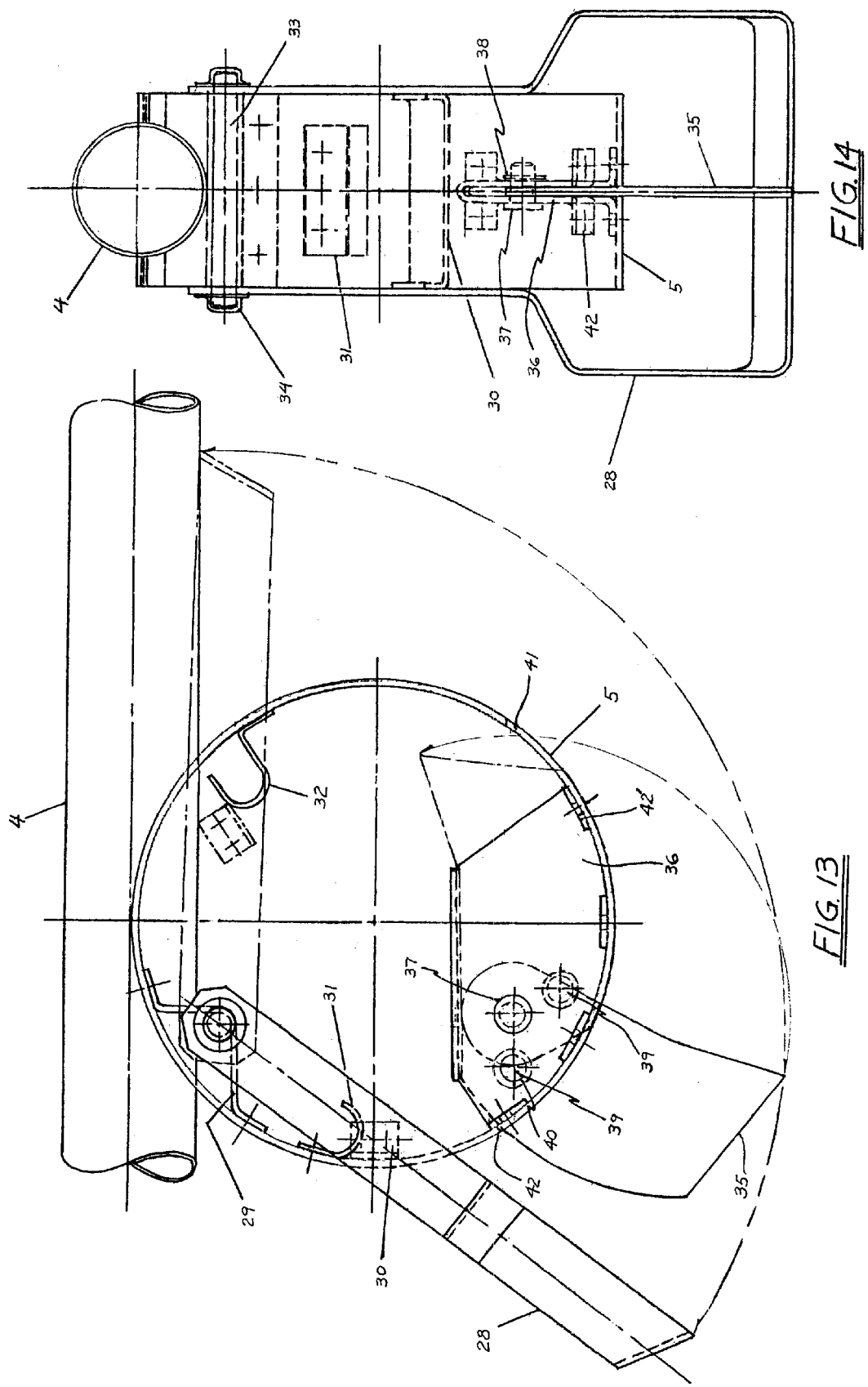

COMBINATION WEEDING TOOL

This application claim the benefit of provisional application No. 60/230,308, filed Sep. 6, 2000.

BACKGROUND OF THE INVENTION

This device relates to an improved weed removal tool for homeowners, gardeners and the like.

The removal of unsightly weeds in lawns and gardens is accomplished by using either chemical or mechanical means. The use of chemicals possesses the disadvantages of using premixed, expensive and usually environmentally sensitive and toxic weed killers. Also, it can require the inconvenience of mixing concentrated solutions to prepare a working mixture. Further, chemicals can damage or destroy adjacent plantings if not carefully applied. They also leave in lawns the remains of a dead weed with its obvious brown color in contrast to the surrounding healthy green grass.

Mechanical weed removal, to be effective, requires removal of different types of weeds. However, although mechanical weed removal avoids the above chemical problems, mechanical weed removal can be manually painstaking and frustrating using one tool to remove a variety of weed roots because of their structure, depths in the soil and tenacity to the soil. Depending upon the type of weed to be removed, the root can be a single, lengthy type root penetrating deep into the soil, or a bushy, hairlike root located a couple of inches below ground surface, or a vine-like root located at or near the surface. Also, the force required to extract large weeds and certain types of weeds having multiple roots can be annoyingly substantial.

The use of existing single-purpose hand weeding tools have very limited capability to effectively remove a variety of weeds using the one tool. As a result, several individual tools must be used by the homeowner and gardener. Because of this inflexibility of single-purpose weeding tools, in many instances, only a part of the root is removed and the weed renews its growth. The combination weeding tool described herein offers that flexibility.

SUMMARY OF THE INVENTION

The weed removal tool described and shown herein has the following advantages over existing single-purpose weed removal tools:

1. A combination of mechanical attachments to the weeding tool offer the user the flexibility to effectively remove weeds having a variety of root structures at different soil depths.
2. The user can adjust the penetration depth of the lifting blade for removal of the lengthy, single type of weed roots.
3. It provides a fulcrum to minimize the weed root extraction force when using the lifting blade.
4. When using the lifting blade, the user can place the tool handle in an optimum forward position initially to reduce excessive backward rotation of the handle for weed removal which is ergonomically desirable.
5. The tool provides access to the fulcrum to apply foot pressure to assist the lifting blade in penetrating the soil.
6. A multiple tine rake is integrated with the fulcrum to effect removal of weeds having bushy type roots located relatively close to the soil surface and is spring-biased to return to the working position while using the adjustable lifting blade.
7. A cultivator bar is integrated with the fulcrum to effect removal of weeds having vine-like roots at or near the soil surface or for use as a general soil tilling attachment.
8. A crevice blade is integrated with the fulcrum to effect removal of weeds sprouting between the narrow gaps of patio blocks and the like.
9. The multiple tine rake, cultivator bar and crevice blade attachments can be readily snapped into inactive storage positions. Also, the cultivator bar and crevice blade can be separately snapped into working positions in relation to the fulcrum.

The foregoing advantages and objects, as well as other and further advantages, objects and geometrical features of the present invention will be manifest in the following detailed description and preferred embodiment thereof when read in connection with the accompanying drawings which form a part of this specification. However, these descriptions and drawings are not to be construed as defining the limits of the invention, for which purpose reference is made to the appended claims. For example, to improve the ergonomics of the tool, the handle may be made in two pieces and adjustable to afford a more forward position to reduce the rearward limit position of the handle to completely extract a weed. Also, a tubular metal handle could be bent in a permanent configuration to suit the typical user's needs.

DESCRIPTION OF THE DRAWINGS

FIG. 1 is a front view of the tool and is characterized by showing the sliding assembly attached to a solid handle.

FIG. 1A is a sectional view showing the concentric arrangement of parts attached to the circular metal fulcrum.

FIG. 2 is a top view of the tool shown in FIG. 1.

FIG. 2A is a sectional view showing the limit stop pin in the solid handle.

FIG. 3 is a front view of the tool and is characterized by showing the sliding fulcrum assembly attached to a tubular handle.

FIG. 3A is a sectional view showing the concentric arrangement of parts with the limit stop pin attached to the pin leaf spring and tubular handle.

FIG. 4 is a top view of the tool shown in FIG. 3.

FIG. 5 is a front view of the tool showing the working and non-working positions of the multiple tine rake attached to the fulcrum assembly.

FIG. 6 is a side view of FIG. 5.

FIG. 7 is a front view of the tool showing the working and non-working positions of the cultivator bar attached to the fulcrum assembly.

FIG. 8 is a side view of FIG. 7.

FIG. 9 is a front view of the tool showing the working and non-working positions of the crevice blade attached to the fulcrum assembly.

FIG. 10 is a side view of FIG. 9.

FIG. 11 is a front view of the tool showing the working and non-working positions of both the multiple tine rake and cultivator bar attached to the fulcrum assembly.

FIG. 12 is a side view of FIG. 11

FIG. 13 is a front view of the tool showing the working and non-working positions of the cultivator bar and crevice blade attached to the fulcrum assembly.

FIG. 14 is a side view of FIG. 13.

DESCRIPTION OF THE PREFERRED EMBODIMENTS

The device as shown in FIGS. 1–14 shows the various preferred embodiments of the combination weeding tool.

The device could be manufactured in any of the following six embodiments:

1. a weeding tool having, in combination, a fulcrum slidably attached to a handle to further effect the penetration depth of a fixed lifting blade.
2. a weeding tool having, in combination with "1" above, a multiple tine rake.
3. a weeding tool having, in combination with "1" above, a cultivator bar.
4. a weeding tool having, in combination with "1" above, a crevice blade.
5. a weeding tool having, in combination with "1" above, a multiple tine rake and a cultivator bar.
6. a weeding tool having, in combination with "1" above a cultivator bar and a crevice blade.

FIGS. 1 and 1A and 2 and 2B show the weeding tool with a solid wood handle (1) having a lifting blade (3) adhesively attached at one end of solid wood handle (1) and reinforced in the end of solid wood handle (1) by a metal ferrule (2). A fulcrum assembly consists of a metal tube (4) welded to a circular metal fulcrum (5) which fits over and slides on solid wood handle (1). Metal tube (4) has either a two-piece or one-piece (depending upon manufacturing preference) plastic plug (6) to close the end of metal tube (4) and is either press-fit into metal tube (4) or secured to metal tube (4) by plastic plug securing screw(s) (7). Plastic plug clearance hole (8) permits lifting blade (3) to slide within plastic plug (6). Metal tube (4) is located and locked into position with respect to solid wood handle (1) by limit stop pin (14). Limit stop bin (14) is biased into position by pin spring (15) enclosed in cavity (13) of solid wood handle (1) and protrudes through one of the three metal tube clearance holes (16) depending upon the length of lifting blade (3) needed for effective weed extraction. Metal tube (4) is maintained in axial sliding alignment with solid wood handle (1) by axial alignment screw (10) secured to wood handle (1) through metal ferrule (2) and guiding metal tube (4) in metal tube alignment slot (11). A dirt cleaning hole (9) is located in the underside of metal tube (4). Fulcrum (5) also has an alignment screw clearance slot (12) to prevent interference of fulcrum (5) with axial alignment screw (10) in the maximum length lifting blade (3) position. Sections A-A and B-B show additional details to further clarify FIGS. 1 and 2.

FIGS. 3 and 3A and 4 show a weeding tool configuration that is very similar to those of FIGS. 1 and 2 except the solid wood handle (1) is replaced by a metal tube handle (17). The end of metal tube handle (22) is deformed as shown in section A-A to permit lifting blade (3) to be concentric with metal tube handle (17) and plastic plug (6) and is welded to metal tube handle (17). Limit stop pin (21), in this embodiment, is fastened to and biased into position with respect to metal tube handle (17) by pin leaf spring (18). Pin leaf spring (18) is secured to lifting blade flat end (19) by pin leaf spring fasteners (20). The functions of all other components are similar to those shown in FIGS. 1 and 2.

FIGS. 5 and 6 show a three tine lifting rake (23) pivotly attached to fulcrum (5) by means of three tine lifting rake support bracket (24) welded to the bottom of fulcrum (5). Attached to the three tine lifting rake (23) is three tine lifting rake retaining bar (25). The three tine lifting rake (23) is secured in either the working (solid lines) or non-working (dashed lines) positions by means of three tine lifting rake retaining bar (25) interacting with three tine lifting rake elastomeric band (26) and three tine lifting rake retaining clip (27) respectively. One end of elastomeric band (26) is attached to lug (26A) integrally formed from fulcrum (5) and the other end to the base of the center tine of three tine lifting rake (23). The functions of all other components are similar to those shown in FIGS. 1–4.

FIGS. 7 and 8 show a cultivator bar (28) pivotly attached to fulcrum (5) by means of cultivator bar support bracket (29) welded to the inside of the upper left quadrant of fulcrum (5) and containing cultivator bar pivot pin (33) and retaining caps (34). Attached to cultivator bar (28) is cultivator bar limit stop bracket (30). Cultivator bar (28) is secured in either the working (solid lines) or nonworking (dashed lines) positions by means of cultivator bar limit stop bracket (30) interacting with cultivator bar retaining clips (31) and (32) respectively attached to the inside of fulcrum (5). The functions of all other components are similar to those shown in FIGS. 1–4.

FIGS. 9 and 10 show a crevice blade (35) attached to and guided within crevice blade shroud (36) using crevice blade hinge pin (37) which is secured to crevice blade shroud (36) by crevice blade hinge pin locking ring (38). Two crevice blade shroud locking holes (39) cooperate with crevice blade dimple (40) to locate the crevice blade (35) in either the working (solid lines) or non-working (dashed lines) positions. Fulcrum slit (41) provides clearance in fulcrum (5) to accommodate the movement of crevice blade (35) into its working and non-working positions. Further, the fulcrum slit (41) provides a positive limiting back-stop (42) for crevice blade (35) during its use. The inside top surface of crevice blade shroud (36) acts as a positive limiting back-stop for the crevice blade (35) in the non-working position. Crevice blade shroud (36) is fastened to fulcrum (5) by crevice blade shroud tabs (42) using rivets or spot welding means. The function of all other components is similar to those shown in FIGS. 1–4.

FIGS. 11 and 12 show a combination of the embodiments shown in FIGS. 5–8.

FIGS. 13 and 14 show a combination of the embodiments shown in FIGS. 7–10.

Also, the weeding tool handle could be fabricated of two pieces, made adjustable and locked together to further improve the tool's ergonomics. Or, if the handle is fabricated of a metal tube it could be permanently bent at a forward angle to suit the typical user's needs.

OPERATION OF THE PREFERRED EMBODIMENTS

The operation of the various embodiments of the combination weeding tool are as follows:

1. FIGS. 1–4 show the basic tool having a fulcrum assembly (4 and 5) which the user can manually slide along the elongated handle (1). The fulcrum assembly is locked in position by spring-biased limit stop pin (14). Manually depressing the limit stop pin allows the user to slide the fulcrum assembly along the elongated handle to adjust the distance between the fulcrum assembly and the tip of the lifting blade (3). The limit stop pin will snap out at the location desired by the user and lock the fulcrum assembly in place. This limits the penetration depth of the lifting blade into the soil which is determined by the user depending upon the size of weed(s) to be extracted. Foot pressure may be applied to the fulcrum to assist in penetrating the soil.

2. FIGS. 5 and 6 show the three tine lifting rake (23) in the working (solid lines) and non-working or storage (dashed lines) positions. For storage, the user manually rotates the three tine lifting rake until the three tin lifting rake retaining bar (25) is snapped under the three tine lifting rake retaining clip (27). For usage, the three tine lifting rake is manually rotated into the working position by the user and retained in that position by the three tine lifting rake elastomeric band (26). Rotating the tool about the fulcrum during use of the lifting blade (3) allows the three tine lifting rake to fold under the fulcrum (5) and not interfere with the lifting blade extraction process. Also, the three tine lifting rake elastomeric band always biases the three tine lifting rake into the working position ready for use without interfering with lifting blade extraction using the fulcrum. Further, use of the three tine lifting rake by the user does not interfere with the tip of the lifting blade when one or the other is used.

3. FIGS. 7 and 8 show the cultivator bar (28) in the working (solid lines) and non-working or storage (dashed lines) positions. For storage, the user rotates the cultivator bar until the cultivator bar limit stop bracket (30) is snapped under the cultivator bar retaining clip (32). For usage, the cultivator bar is manually rotated into the working position by the user and retained in that position by being snapped under the cultivator bar retaining clip (31) by the cultivator bar limit stop bracket.

4. FIGS. 9 and 10 show a crevice blade (35) in the working (solid lines) and non-working or storage (dashed lines) positions. The user manually moves the crevice blade out of the crevice blade shroud (36) until it is snapped into the working position by forcing the crevice blade dimple (40) to engage a crevice blade shroud locking hole (39). Reversing this manual procedure by the user causes the crevice blade to be snapped into the second crevice blade shroud locking hole to achieve the storage position.

5. FIGS. 11 and 12 show the combination of the cultivator bar (28) and three tine lifting rake (23) attached to the fulcrum (5) in the working and non-working positions. With such a combination and for practical purposes only, the cultivator bar or the three tine lifting rake should be manually rotated into the working position by the user at one time.

6. FIGS. 13 and 14 show the combination of the cultivator bar (28) and crevice blade (35) attached to the fulcrum (5) in the working and non-working positions. With such a combination and for practical purposes only, the cultivator bar or the crevice blade should be manually rotated into the working position by the user at one time.

I claim:

1. A combination weeding tool comprising:
   a. an elongated handle having a lifting blade fixedly attached at one end thereof, and
   b. a fulcrum assembly comprising a fulcrum fixedly attached to a hollow enclosure, said hollow enclosure slidably attached to said elongated handle and said lifting blade, whereby the distance between said fulcrum assembly and the tip of said lifting blade can be varied, and
   c. locking means cooperating with said fulcrum assembly and said elongated handle to provide locked positions of said fulcrum assembly with respect to the tip of said lifting blade, and
   d. guiding means cooperating with said fulcrum assembly and said elongated handle to maintain alignment of said fulcrum assembly with respect to the tip of said lifting blade and said locking means, and
   wherein said fulcrum assembly includes a multiple tine rake rotatably secured to said fulcrum of said fulcrum assembly.

2. The combination weeding tool of claim 1 wherein said multiple tine rake cooperating with storage position locking means secured to said fulcrum of said fulcrum assembly, for captive storage of said multiple tine rake in conformal proximity to the surface of said fulcrum of said fulcrum assembly, and includes spring means cooperating with said fulcrum and said multiple tine rake whereby said multiple tine rake is spring-biased into the working position.

3. The combination weeding tool of claim 1 wherein said fulcrum assembly includes a cultivator bar rotatably secured to said fulcrum of said fulcrum assembly.

4. The combination weeding tool of claim 3 wherein said cultivator bar cooperating with storage position locking means secured to said fulcrum of said fulcrum assembly, for captive storage of said cultivator bar in proximity to the surface of said hollow enclosure of said fulcrum assembly, and includes working position locking means secured to said fulcrum whereby said cultivator bar is locked in the working position.

5. A combination weeding tool comprising:
   a. an elongated handle having a lifting blade fixedly attached at one end thereof, and
   b. a fulcrum assembly comprising a fulcrum fixedly attached to a hollow enclosure, said hollow enclosure slidably attached to said elongated handle and said lifting blade, whereby the distance between said fulcrum assembly and the tip of said lifting blade can be varied, and
   c. locking means cooperating with said fulcrum assembly and said elongated handle to provide locked positions of said fulcrum assembly with respect to the tip of said lifting blade, and
   d. guiding means cooperating with said fulcrum assembly and said elongated handle to maintain alignment of said fulcrum assembly with respect to the tip of said lifting blade and said locking means, and
   wherein said fulcrum assembly includes a crevice blade rotatably secured to said fulcrum of said fulcrum assembly.

6. The combination weeding tool of claim 5 wherein said crevice blade cooperating with storage position locking means secured to said fulcrum of said fulcrum assembly, for captive storage of said crevice blade in conformal proximity to the surface of said fulcrum of said fulcrum assembly, and includes working position locking means secured to said fulcrum whereby said crevice blade is locked in the working position.

7. A combination weeding tool comprising:
   a. an elongated handle having a lifting blade fixedly attached at one end thereof, and
   b. a fulcrum assembly comprising a fulcrum fixedly attached to a hollow enclosure, said hollow enclosure slidably attached to said elongated handle and said lifting blade, whereby the distance between said fulcrum assembly and the tip of said lifting blade can be varied, and
   c. locking means cooperating with said fulcrum assembly and said elongated handle to provide locked positions of said fulcrum assembly with respect to the tip of said lifting blade, and
   d. guiding means cooperating with said fulcrum assembly and said elongated handle to maintain alignment of said fulcrum assembly with respect to the tip of said lifting blade and said locking means, and
   wherein said fulcrum assembly further comprises a cultivator bar rotatably secured to said fulcrum of said fulcrum assembly.

8. The combination weeding tool of claim 7 wherein said cultivator bar cooperating with storage position locking means secured to said fulcrum of said fulcrum assembly, for captive storage of said cultivator bar in proximity to the surface of said hollow enclosure of said fulcrum assembly, and includes working position locking means secured to said fulcrum whereby said cultivator bar is locked in the working position.

9. The combination weeding tool of claim 7 wherein said fulcrum assembly includes a crevice blade rotatably secured to said fulcrum of said fulcrum assembly.

10. The combination weeding tool of claim 9 wherein said crevice blade cooperating with storage position locking means secured to said fulcrum of said fulcrum assembly, for captive storage of said crevice blade in conformal proximity to the surface of said fulcrum of said fulcrum assembly, and includes working position locking means secured to said fulcrum whereby said crevice blade is locked in the working position.

11. A combination weeding tool comprising:
   a. an elongated handle having a lifting blade fixedly attached at one end thereof, and
   b. a fulcrum assembly comprising a curved fulcrum and tubular member, said curved fulcrum fixedly attached to said tubular member and having the axis of said curved fulcrum substantially perpendicular to the axis of said tubular member, said tubular member slidably attached to said elongated handle and said lifting blade, and having the axis of said tubular member substantially coincident with the axis of said elongated handle, and said tubular member terminating with a nose plug fixedly attached to said tubular member and cooperating with said lifting blade, whereby said nose plug further slidably supports said fulcrum assembly with respect to said elongated handle, and
   c. locking means cooperating with said elongated handle and said fulcrum assembly to lock said fulcrum assembly with respect to said elongated handle at predetermined locations along said elongated handle whereby the distance of said fulcrum assembly can be varied with respect to the tip of said lifting blade, and
   d. linear guiding means cooperating with said fulcrum assembly and said elongated handle to maintain linear alignment of said fulcrum assembly with respect to the tip of said lifting blade and said locking means.

12. The combination weeding tool of claim 11 wherein said fulcrum assembly includes a multiple tine rake rotatably secured to said curved fulcrum by a rake support bracket, said rake support bracket fixedly attached to the outside surface of said curved fulcrum of said fulcrum assembly.

13. The combination weeding tool of claim 12 wherein said multiple tine rake cooperating with storage position resilient locking means secured to the inside surface of said curved fulcrum of said fulcrum assembly, for captive storage of said multiple tine rake in conformal proximity the inside and outside surfaces of said curved fulcrum of said fulcrum assembly, and includes spring means cooperating with said curved fulcrum and said multiple tine rake whereby said multiple tine rake is spring-biased into the working position.

14. The combination weeding tool of claim 11 wherein said fulcrum assembly includes a cultivator bar rotatably secured to said curved fulcrum by a cultivator bar support bracket, said cultivator bar support bracket fixedly attached to the inside surface of said curved fulcrum of said fulcrum assembly.

15. The combination weeding tool of claim 14 wherein said cultivator bar cooperating with storage position resilient locking means secured to the inside surface of said curved fulcrum of said fulcrum assembly, for captive storage of said cultivator bar in proximity to the outside surface of said hollow enclosure of said fulcrum assembly, and further includes working position additional resilient locking means secured to the inside surface of said curved fulcrum whereby said cultivator bar is resiliently locked in the working position.

16. The combination weeding tool of claim 11 wherein said fulcrum assembly includes a crevice blade rotatably secured to said curved fulcrum within a crevice blade shroud using a crevice blade hinge pin, said crevice blade shroud fixedly attached to the inside surface of said curved fulcrum of said fulcrum assembly.

17. The combination weeding tool of claim 16 wherein said crevice blade cooperating with said crevice blade shroud to effect storage position interference locking means, for captive storage of said crevice blade within said crevice blade shroud in conformal proximity to the outside surface of said curved fulcrum of said fulcrum assembly, and further includes said crevice blade cooperating with said crevice blade shroud to effect the working position interference locking means.

18. The combination weeding tool of claim 11 wherein said locking means cooperating with said fulcrum assembly and said elongated handle is a spring-biased locking means and said linear guiding means is fixedly attached to said elongated handle.

19. A method for extracting weeds from soil, said weeds having a variety of root structural characteristics using a combination tool by:
   a. providing integrally and slidably fastened fulcrum means cooperating with lifting blade means for extracting single, lengthy, tapered shaped weed roots that require deep penetration into said soil for extraction, and
   b. providing integrally and rotatably fastened soil surface scraping means for vine-like weed roots that grow substantially at the surface of said soil, and
   c. providing integrally and rotatably fastened raking means to extract weeds having a multitude of fine hair-like roots growing in proximity to the surface of said soil, and
   whereby said combination tool can be conveniently adapted to extract weeds having a variety of structural root characteristics without resorting to individual weed extraction tools.

20. A method for extracting weeds from soil, said weeds having a variety of root structural characteristics using a combination tool by:
   a. providing integrally and slidably fastened fulcrum means cooperating with lifting blade means for extracting single, lengthy, tapered shaped weed roots that require deep penetration into said soil for extraction, and
   b. providing integrally and rotatably fastened soil surface scraping means for vine-like weed roots that grow substantially at the surface of said soil, and
   c. providing integrally and rotatably fastened blade-like means to extract weeds that grow in soil between narrow openings in patio blocks or the like, and
   whereby said combination tool can be conveniently adapted to extract weeds having a variety of structural root characteristics and difficult extraction growing locations without resorting to individual weed extraction tools.

* * * * *